US007653476B2

(12) United States Patent
To et al.

(10) Patent No.: US 7,653,476 B2
(45) Date of Patent: Jan. 26, 2010

(54) METHOD AND SYSTEM FOR CONTINUOUSLY CONTROLLING AN INTERNAL COMBUSTION ENGINE ON AN ENGINE BENCH TESTING UNIT

(75) Inventors: Binh Kim To, Courbevoie (FR); Olivier Lejeune, Beynes (FR)

(73) Assignee: Institut Francais du Petrole, Ruell Malmaison Cedex (FR)

( * ) Notice: Subject to any disclaimer, the term of this patent is extended or adjusted under 35 U.S.C. 154(b) by 189 days.

(21) Appl. No.: 11/579,586

(22) PCT Filed: May 4, 2005

(86) PCT No.: PCT/FR2005/001173

§ 371 (c)(1),
(2), (4) Date: Aug. 9, 2007

(87) PCT Pub. No.: WO2005/116605

PCT Pub. Date: Dec. 8, 2005

(65) Prior Publication Data

US 2008/0009998 A1    Jan. 10, 2008

(30) Foreign Application Priority Data

May 7, 2004    (FR)    ................................. 04 05010

(51) Int. Cl.
*G06F 19/00*     (2006.01)
*F02D 41/26*     (2006.01)
*F02P 5/15*      (2006.01)
*F02M 51/00*     (2006.01)

(52) U.S. Cl. .................. 701/104; 701/110; 123/406.59; 123/478

(58) Field of Classification Search ................. 123/478, 123/480, 486, 490, 568.21–568.28, 406.58–406.65; 701/101–105, 108, 114, 115; 251/129.15, 251/129.16; 361/152–154
See application file for complete search history.

(56) References Cited

U.S. PATENT DOCUMENTS 4,151,815 A * 5/1979 Bramwell et al. ............ 123/486
5,201,296 A    4/1993 Wunning et al.

(Continued)

FOREIGN PATENT DOCUMENTS

DE    101 60 476 A1    6/2001

(Continued)

*Primary Examiner*—Willis R Wolfe, Jr.
(74) *Attorney, Agent, or Firm*—Antonelli, Terry, Stout & Kraus, LLP.

(57) ABSTRACT

The present invention relates to a system and a method for continuous operation of an internal-combustion engine (2), comprising at least an actuator connected to a working device of the engine, an electronic circuit board or card (3) comprising a programmable logic FPGA component, means (9, 10) for synchronizing the card according to the engine cycle, and a central processing unit (CPU). The invention comprises: generating, through the component, a plurality of actuator control pulses, the pulses being parameterizable in phase and in duration, being independent, linked with a single cylinder and synchronized by an angular reference point in the engine cycle for each cylinder; determining pulse parameters and assigning these parameters to the pulses by means of a computing program included in the CPU of the microcomputer at each physical output; and controlling at least one of the actuators by a logic output signal of the circuit board corresponding to at least one of the control pulses.

14 Claims, 4 Drawing Sheets

U.S. PATENT DOCUMENTS

| | | |
|---|---|---|
| 5,318,449 A | 6/1994 | Schoell et al. |
| 5,434,800 A * | 7/1995 | Davis et al. ............... 701/102 |
| 6,600,959 B1 * | 7/2003 | Coulman et al. ............ 700/7 |
| 6,891,417 B2 * | 5/2005 | Khondker et al. .......... 327/165 |

FOREIGN PATENT DOCUMENTS

| | | |
|---|---|---|
| DE | 101 47 484 A1 | 4/2003 |
| EP | 1 111 221 A2 | 6/2001 |
| GB | 1 395 027 | 5/1975 |

* cited by examiner

METHOD AND SYSTEM FOR CONTINUOUSLY CONTROLLING AN INTERNAL COMBUSTION ENGINE ON AN ENGINE BENCH TESTING UNIT

CROSS REFERENCE TO RELATED APPLICATION

This application is related to U.S. Ser. No. 11/578,599, filed Nov. 6, 2006, and entitled "Method and System for Multi-Purposely Controlling An Internal-Combustion Engine on an Engine Bench Testing Unit".

BACKGROUND OF THE INVENTION

1. Field of the Invention

The present invention relates to a method and to an associated system comprising an electronic circuit board referred to hereinafter as a "TIMER PCI" allowing operation of any type of internal-combustion engine, 2 or 4 stroke, gasoline (mono and multispark), diesel (mono and multi-injection), according to a distribution extended to four cylinders per circuit board and according to a complete engine control autonomy principle that considerably relieves the real-time activity of the central unit.

2. Description of the Prior Art

Operating an engine has been performed either using commercial computers generally available to the general public whose use is limited to the range of operation of the engine defined by the car manufacturer according to a principle of centralized real-time activity management within the computer microcontroller, or using specific R&D engine test bench control equipments used by manufacturers of car parts to develop all the engine control strategies and whose use is limited to a make of car according to a principle of centralized real-time activity management within the central unit of the system.

SUMMARY OF THE INVENTION

On the other hand, the system and the method according to the invention have the advantage of providing operation of any type of engine independently of the car manufacturer and/or the associated car parts manufacturer and providing a mechanism of operation open to all the engine control strategy development perspectives based, on the one hands on the increasing power of PC compatible microcomputers and, on the other hand, on a complete operational autonomy principle that considerably relieves the real-time activity of the central unit.

The present invention thus relates to a method for operating an internal-combustion engine, comprising at least an actuator connected to a working device of the engine, an electronic circuit board comprising a programmable logic component, means for synchronizing the circuit board according to the engine cycle and a central processing unit (CPU). The invention comprises:

generating, through the component, a plurality of actuator control pulses, the pulses being parameterizable in phase and in duration, independent, linked with a single cylinder and synchronized by an angular reference point in the engine cycle for each cylinder;

determining the pulse parameters and assigning parameters to the pulses by means of a computing program included in the CPU of the microcomputer at each physical output; and controlling at least one of the actuators by a logic output signal of the card corresponding to at least one of the control pulses.

The pulses can be generated at a frequency corresponding to the angular coding frequency, and the CPU of the microcomputer can determine the parameters at a lower frequency.

Synchronization can be obtained from at least one of the following sensors:

for a 2-stroke engine: an angular coder or a 58× vehicle target;

for a 4-stroke engine: a camshaft sensor and at least an angular coder, or a 58× vehicle target.

The invention also relates to a system for operating an internal-combustion engine, comprising at least an actuator connected to a working device of the engine, an electronic circuit board comprising a programmable logic FPGA component, means for synchronizing the card according to the engine cycle, and an industrial microcomputer. In the system:

the component comprises means programmed to:

generate an angular reference point in the engine cycle for each cylinder;

generate a plurality of actuator control pulses parameterizable in phase and in duration, the pulses being independent and linked with a cylinder;

the CPU of the microcomputer comprises means for determining the pulse parameters; and means for controlling at least one of the actuators by means of a circuit board output signal corresponding to at least one of the control pulses.

The synchronization means can comprise:

for a 2-stroke engine, at least one of the following sensors: an angular coder and a 58× vehicle target, for a 4-stroke engine, a camshaft sensor and at least one of the following sensors: an angular coder and a 58× vehicle target.

The actuator can be: an injection nozzle, a spark plug, an electromagnetic valve control or a LASER camera shot.

BRIEF DESCRIPTION OF THE DRAWINGS

Other features and advantages of the present invention will be clear from reading the description hereafter of an embodiment given by way of non limitative example, with reference to the accompanying figures wherein.

DETAILED DESCRIPTION

Figure 1:
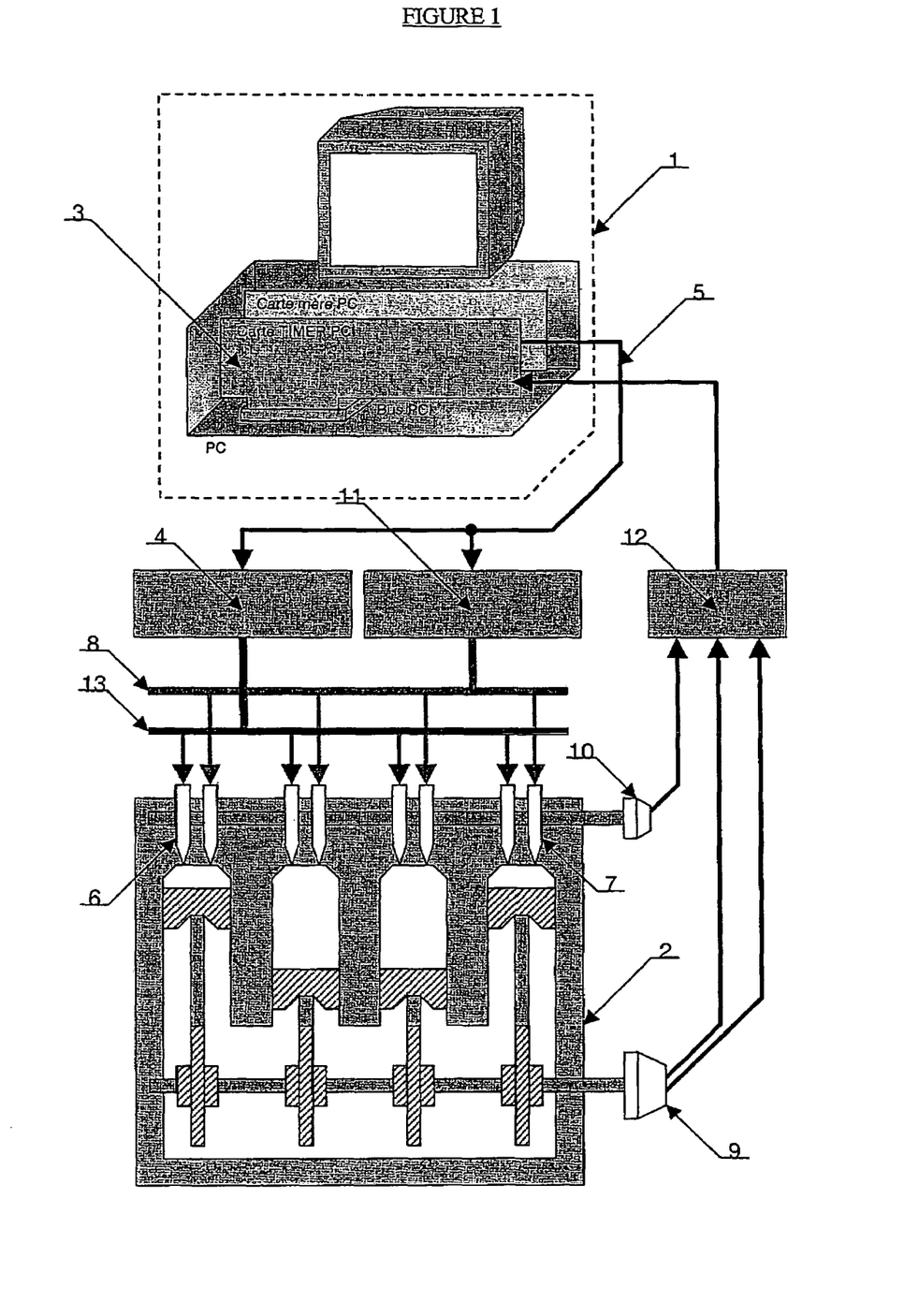
FIG. 1 diagrammatically shows the implementation of the invention.

FIG. 1 shows an engine 2 operated by means of a PC type computer 1 comprising a TIMER PCI type electronic circuit board 3. The system is synchronized to the signals of an angular coding system 9. The coding system can be either an angular coder delivering "revolution signal" information or "angular signal" information of resolution equal to 1° CA, ½° CA, ⅕° CA or ¹⁄₁₀° CA, knowing that, in the figure, ° V=° CA=crank angle degree, or a 58× type vehicle target, that is having 60 teeth of 6° crank angle resolution (with 2 consecutive teeth missing) fastened to the crankshaft of engine 2. A second synchronization sensor 10 connected to the camshaft allows recognition of the revolution of the reference cylinder (usually cylinder No. 1) for a four-stroke engine whose combustion cycle equals two revolutions. Reference number 12 designates an angular coding signal conditioning and shaping unit.

The TIMER PCI card has the standard format of the PCI bus of a PC compatible microcomputer. It generates the control pulses of the actuators (for example in FIG. 1: fuel injection nozzles 7, spark plugs 6) via dedicated power interfaces, for example a spark generator 4 through a multiconductor 13 or an injection power interface 11 through a multiple conductor 8, themselves connected to the circuit board by a multiple conductor 5.

The TIMER PCI circuit board is a FPGA (Field Programmable Gate Array) type programmable logic component, a component forming the interface with the PCI bus of the PC compatible microcomputer, circuits providing electrical isolation of the inputs/outputs and circuits providing the required supplies.

The FPGA component contains all the functionalities provided by the TIMER PCI circuit board. They are described in VHDL language (Very High Speed Integrated Circuit "VHSIC" Hardware Description Language).

The organization of these functionalities allows generation of up to 8 control pulses per cylinder per engine cycle, for a diesel or gasoline 2 or 4 stroke engine up to 4 cylinders.

It is based on taking into account 4 complex logic synchronization inputs coming, on the one hand, from an angular coding system of the engine crankshaft such as an angular coder or a 58× vehicle target and, on the other hand, from a camshaft sensor AAC of any type.

It allows control of 16 electrically isolated (mass decoupling) complex logic outputs for generation of the control pulses (4 outputs per cylinder). Each control pulse is parameterized for each engine cycle by phase and duration. The phase is always expressed in crank angle degrees according to a selected angular precision (1° CA, ½° CA, ⅕° CA or ⅒° CA). The duration can be expressed in crank angle degrees according to a selected angular precision (1° CA, ½° CA, ⅕° CA or ⅒° CA) or to a selected time precision expressed in microseconds (μs).

The invention uses the working principle of the TIMER PCI circuit board that guarantees continuous operability of the engine while relieving the real-time activity of the CPU of the PC compatible industrial microcomputer.

A specific reference called "Combustion top dead center PMH" is assigned to each cylinder, knowing that the working order of the cylinders of a 4-stroke engine is 1/3/4/2. The 8 control pulses (per channel or per cylinder) are phase and duration programmable in relation to their respective "combustion" top dead center PMH.

Figure 2:
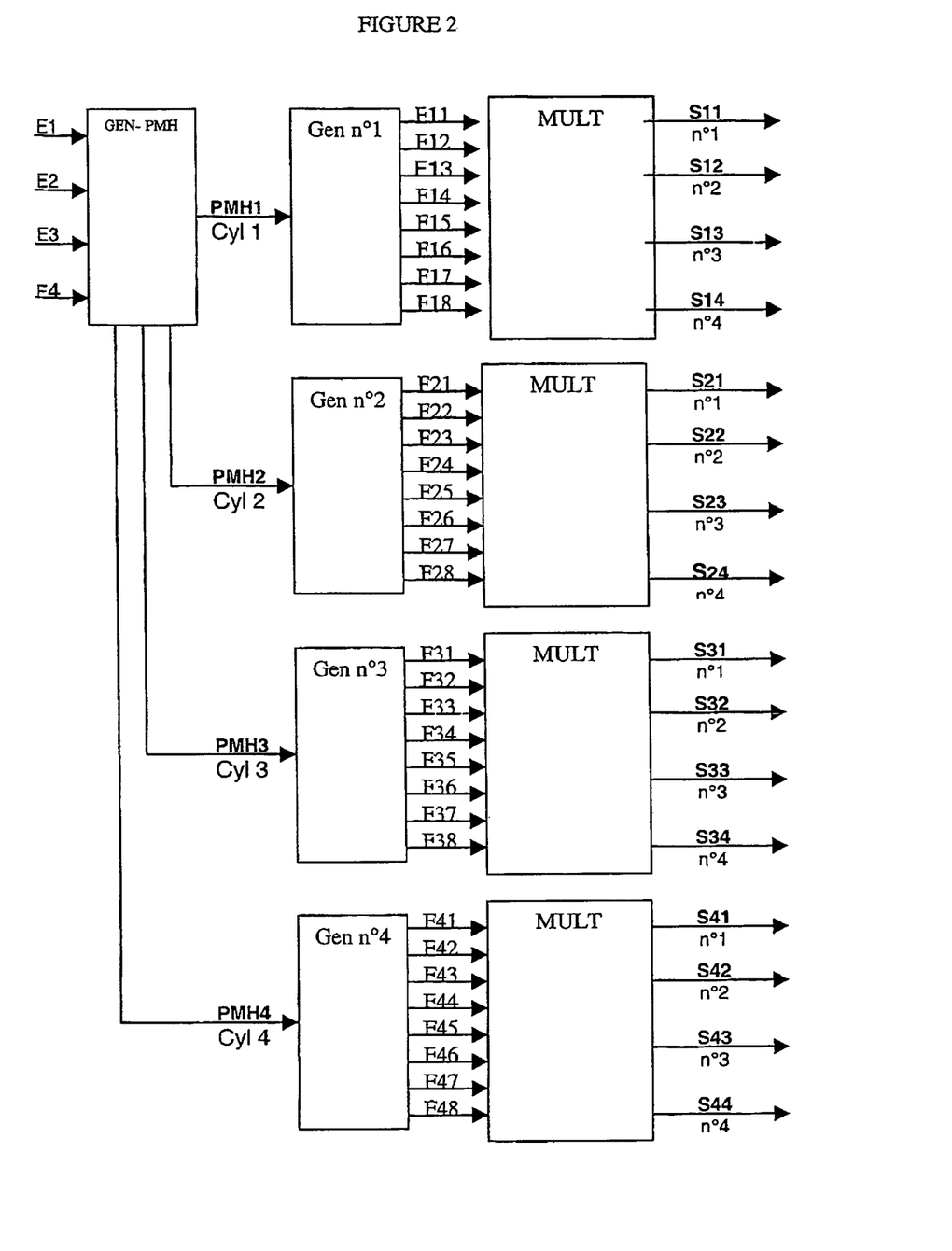
FIG. 2 describes the structure and the organization of the invention.

FIG. 2 shows a block diagram of the FPGA component that illustrates the organization selected. It is divided up into four totally identical subassemblies (cylinder 1 to cylinder 4).

Each one of these block diagrams provides:

generation (GEN-PMH) of a top dead center PMH specific to the cylinder considered (PMH1, PMH2, PMH3, PMH4), wherein:

E1: input of the "angular signal" of the angular coder (1° CA, ½° CA, ⅕° CA or ⅒° CA);

E2: input of the AAC signal of the camshaft sensor;

E3: input of the "revolution signal" of the angular coder;

E4: input of the signal of the 58× vehicle target (60-teeth ring with 2 consecutive teeth missing);

generation (GEN 1-4) of 8 independent pulses specifically linked with the cylinder considered, Fxy representing an internal signal characterized by the presence of a pulse defined by a phasing and a duration per engine cycle on the cylinder considered x, y from 1 to 8; and multiplexing (MULT) of the 8 previous pulses in order to ensure distribution thereof over each of the 4 physical outputs, specifically linked with the cylinder considered, Sxz: output z (1-4) of a signal can be the combination of signals Fxy per engine cycle on cylinder x.

This distribution can be operated in a flexible way by programming and allows orientation of from 0 to 8 pulses, in any order, towards any one of the four physical outputs.

What is referred to as "pulse" is the elementary actuator control protocol. The pulse is characterized by the combination of two parameters: "phase" which designates the angular position at the start or at the end of the actuator control on the engine cycle considered, and "duration" which designates, from the "phase" above, the time when control of the actuator on the engine cycle considered is stopped.

Figure 3:
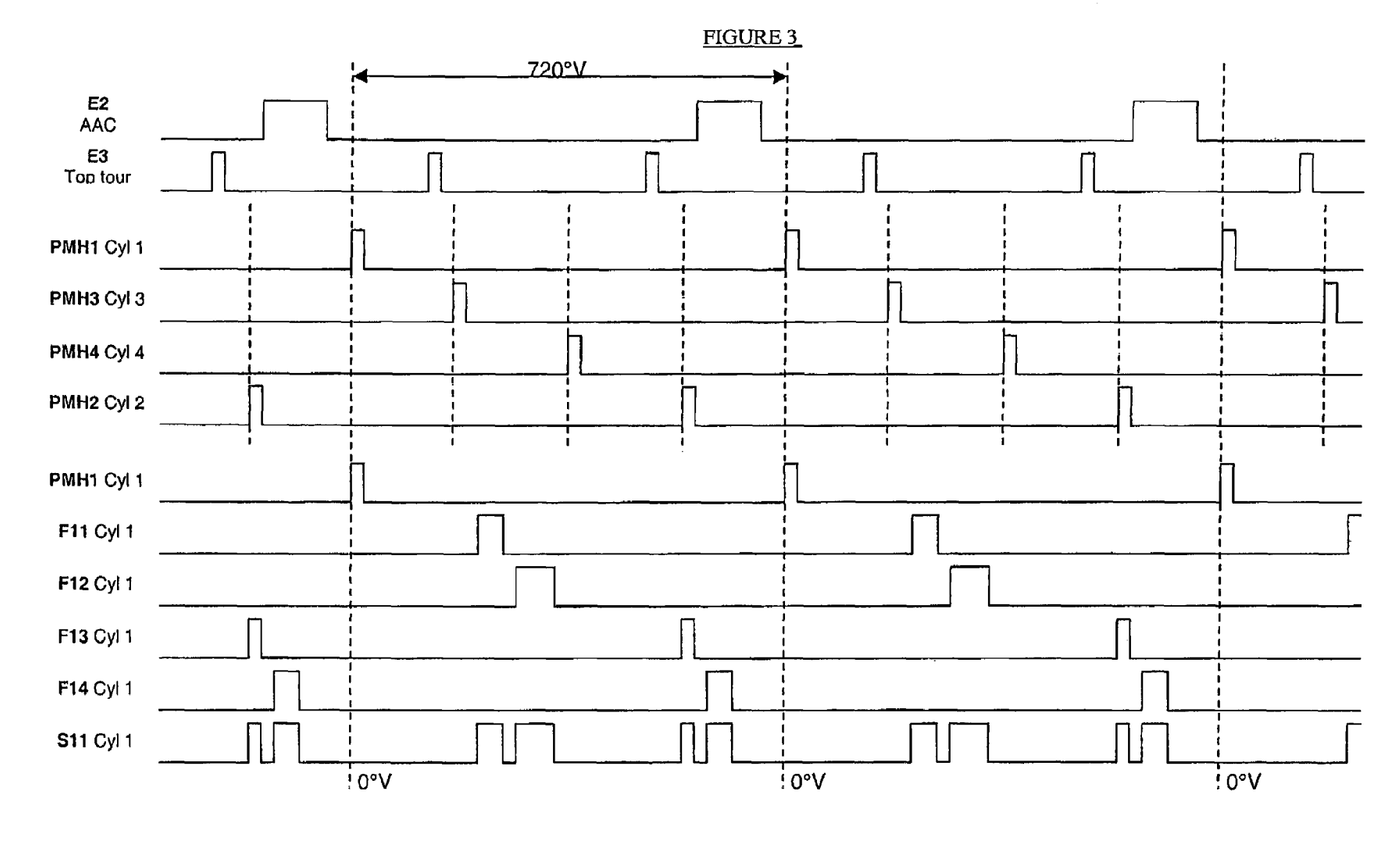
FIG. 3 shows an example of signal generation.

FIG. 3 shows an example of generation of a signal S11 which is a combination of signals F11, F12, F13 and F14 on reference frame PMH1 corresponding to cylinder 1. Reference frame PMH1 is made up from references E2 (AAC) and E3 (revolution signal).

Two examples showing the flexibility of such an organization are described hereafter.

Example 1

Operating a Conventional 4-Stroke Gasoline 4-Cylinder Engine

This engine is operated by controlling 4 ignition coils and 4 injection nozzles. Each one of these 8 actuators requires a logic output of the TIMER PCI circuit board. Finally, each one of these 8 logic outputs must have an elementary control pulse characterized by its phasing and duration parameterization.

Logical parameterization of the TIMER PCI card from the PC compatible microcomputer thus generates two pulses per cylinder and assigns each one of these two pulses to a distinct logic output. Thus, operating the engine can be performed without bringing any material change to the TIMER PCI circuit board.

Example 2

Operating a Multiple-Injection (8 Injections Per Engine Cycle) 4-Stroke Common Rail Diesel 4-Cylinder Engine This engine is operated by controlling 4 injection nozzles. Each one of these four actuators requires a logic output of the TIMER PCI card. Finally, each one of these 4 logic outputs must have a set of 8 elementary control pulses characterized by their phase and duration parameterization.

Logical parameterization of the TIMER PCI card thus generates 8 pulses per cylinder and assigns all of these eight pulses to a single logic output. Thus, operating the engine can be performed without bringing any material change to the TIMER PCI circuit board.

When analyzing the operating principle of the car computers that provide engine control of a commercial vehicle, control of the actuators, which require precise synchronization with the revolution of the engine crankshaft, is operated by the CPU of the engine control dedicated computer.

If Example 2 is considered relative to a multiple-injection (8 injections per engine cycle) 4-stroke Common Rail diesel 4-cylinder engine, it means that the CPU of the engine control dedicated computer has to:

manage the operation of 32 pulses (8 pulses×4 cylinders) per engine cycle from the vehicle target allowing location of the angular position of the engine crankshaft;

compute, according to the engine running conditions, the 64 control parameters (phase and duration of the 32 pulses) per engine cycle.

This can also be acknowledged by analyzing the operating principle of car and car parts manufacturers' R&D engine test bench advanced engine control development systems.

Within the context of the development of the ACEbox™ system equipped with the TIMER PCI circuit board that makes up the operating system developed by the assignee for its requirement in the field of R&D engine test benches requiring advanced engine control, it has been decided to rely on an evolutive technology. The principle selected in the ACEbox™ system is based on the use of a PC compatible industrial microcomputer fitted with one or more TIMER PCI circuit boards (one board for 4 cylinders).

The invention provides:

the management of control pulses of the actuators requiring precise synchronization with the revolution of the engine crankshaft (performed by the TIMER PCI circuit board), the computation of the configuration parameters of these pulses (performed by the CPU of the industrially available microcomputer).

In fact, the evolutivity of the ACEbox™ system obtained through the possibility of replacing the CPU of the industrially available microcomputer by another, more effective CPU in order to guarantee an increasingly pertinent and therefore ever faster real-time evaluation of the engine control computations is all the more efficient since this CPU is relieved of the requirement of the real-time sequencing or synchronization of the control pulses of the actuators.

Figure 4:
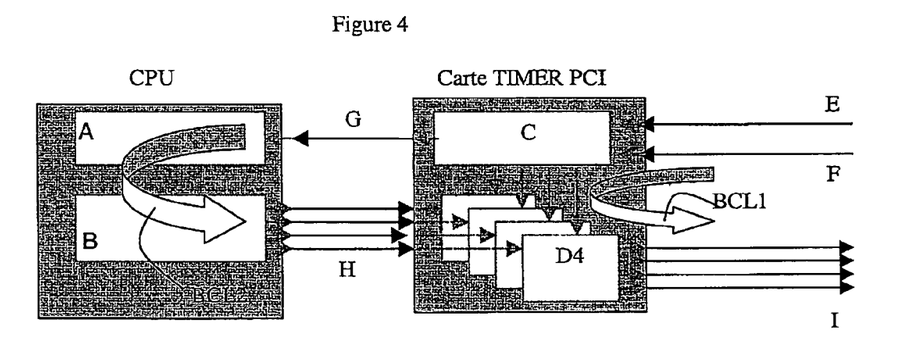
FIG. 4 describes the simultaneous operation of the TIMER PCI electronic circuit board within a PC compatible industrially available microcomputer.

The principle of relieving the CPU of the industrially available microcomputer from the requirement of sequencing of the control pulses of the actuators is described in the block diagram of FIG. 4, wherein:

A designates the program and "B" stop task. It accounts for all the events "G";

B designates the evaluation program for the configuration parameters (phase and duration) of the control pulses of the actuators. This program must also guarantee evaluation of all the other configuration parameters of all the engine actuators;

C designates the part of the VHDL program of the FPGA programmable logic component of the TIMER PCI circuit board that provides, on one hand, real-time regeneration of the angular reference frames of 4 cylinders and, on another hand, generation of events "G" by correlation of synchronization events "E" and "F";

D1 to D4 designate the 4 identical parts of the FPGA programmable logic component of the TIMER PCI card that provides angular synchronization of the actuators control pulses for the 4 cylinders;

E designates the events from the engine crankshaft angular coding system such as an angular coder or a 58× vehicle target;

F designates the events from the camshaft angular coding for a 4-stroke engine (example: camshaft sensor AAC);

G designates the synchronization events of the engine control parameter evaluation program. The frequency of this event is generally equal to the frequency of the "Combustion top dead center PMH" of the 4 cylinders of an engine, that is all the half revolutions of the engine crankshaft. It can reach a frequency equal to the 58× vehicle target, i.e. every 6° CA;

H designates the configuration parameters for the control pulses of the actuators operated by the TIMER PCI card; and I designates the 4×4 TTL output signals (S11 to S44—FIG. 2) that drive the TIMER PCI card.

The block diagram of FIG. 4 allows clearly showing the simultaneous operation of the TIMER PCI circuit board and of the engine control management program of the industrial PC CPU.

The TIMER PCI circuit board as described guarantees precise and fast operation of the engine according to loop BCL1:

It is precise because the definition of the control pulse parameters of the actuators can reach a resolution of 0.1° CA and/or 1 µS, and It is fast because engine cycle slicing at 0.1° CA and/or 1 µs allows the response times of the control signals to be minimized.

The control parameters of the actuators control pulses of the TIMER PCI circuit board are updated according to loop BCL2 whose frequency can reach a rate that is 1800 times lower than the frequency of loop BCL1 (for example: loop BCL2 operated every "Combustion top dead center PMH" on a 4-cylinder engine and loop BCL1 every 0.1° CA).

The present invention provides operational autonomy of the TIMER PCI circuit board that allows guaranteeing that the engine is continuously operated according to loop BCL1 without requiring such an extensive use of loop BCL2 which involves the program that updates the control parameters. Thus, in an extreme case where loop BCL2 should have to be interrupted, the engine actuators are still operated by loop BCL1 with constant control and checking parameters corresponding to the last update.

The invention claimed is:

1. A method for operating an internal-combustion engine, comprising at least one actuator connected to a working device of the engine, an electronic circuit board comprising a programmable logic FPGA component, means for synchronizing the circuit board according to the engine cycle and a central processing unit, comprising:

generating, through the component, a plurality of actuator control pulses, the pulses being parameterizable in phase and in duration, being independent, being linked with a single cylinder and being synchronized by an angular reference point in the engine cycle for each cylinder;

determining the pulse parameters and assigning the parameters to the pulses by a computation program included in the central processing unit at each physical output; and controlling at least one of the actuators by a logic output signal of the circuit board corresponding to at least one of the control pulses; and wherein synchronization is obtained from at least one of the following sensors: for a 2-stroke engine: an angular coder and a 58× vehicle target; and for a 4-stroke engine: a camshaft sensor and at least: an angular coder and a 58× vehicle target.

2. A method for operating an internal-combustion engine, comprising at least one actuator connected to a working device of the engine, an electronic circuit board comprising a programmable logic FPGA component, means for synchronizing the circuit board according to the engine cycle and a central processing unit, comprising:

generating, through the component, a plurality of actuator control pulses, the pulses being parameterizable in phase and in duration, being independent, being linked with a single cylinder and being synchronized by an angular reference point in the engine cycle for each cylinder;

determining the pulse parameters and assigning the parameters to the pulses by a computation program included in the central processing unit at each physical output;

controlling at least one of the actuators by a logic output signal of the circuit board corresponding to at least one of the control pulses; and wherein generation of the pulses is performed at a frequency corresponding to the angular coding frequency and the microcomputer CPU determines the parameters at a lower frequency;

synchronization is obtained from at least one of the following sensors for a 2-stroke engine: an angular coder and a 58× vehicle target; and for a 4-stroke engine: a camshaft sensor and at least: an angular coder and a 58× vehicle target.

3. A method for operating an internal-combustion engine, comprising at least one actuator connected to a working device of the engine, a programmable logic component, means for synchronizing the component according to the engine cycle and a central processing unit, comprising generating, through the component, a plurality of actuator control pulses, the pulses being parameterizable in phase and in duration, being independent, being linked with a single cylinder and being synchronized by an angular reference point in the engine cycle for each cylinder;

determining the pulse parameters and assigning the parameters to the pulses by a computation program included in the central processing unit at each physical output; and controlling at least one of the actuators by a logic output signal of the component corresponding to at least one of the control pulses; and wherein synchronization is obtained from at least one of the following sensors: for a 2-stroke engine: an angular coder and a 58× vehicle target; and for a 4-stroke engine: a camshaft sensor and at least: an angular coder and a 58× vehicle target.

4. A method for operating an internal-combustion engine, comprising at least one actuator connected to a working device of the engine, a programmable logic component, means for synchronizing the component according to the engine cycle and a central processing unit, comprising:

generating, through the component, a plurality of actuator control pulses, the pulses being parameterizable in phase and in duration, being independent, being linked with a single cylinder and being synchronized by an angular reference point in the engine cycle for each cylinder;

determining the pulse parameters and assigning the parameters to the pulses by a computation program included in the central processing unit at each physical output; and controlling at least one of the actuators by a logic output signal of the component corresponding to at least one of the control pulses; and wherein generation of the pulses is performed at a frequency corresponding to the angular coding frequency and the central processing unit determines the parameters at a lower frequency; and synchronization is obtained from at least one of the following sensors: for a 2-stroke engine: an angular coder and a 58× vehicle target; and for a 4-stroke engine: a camshaft sensor and at least: an angular coder and a 58× vehicle target.

5. A method for operating an internal-combustion engine, comprising at least one actuator connected to a working device of the engine, an electronic circuit board comprising a programmable logic FPGA component, means for synchronizing the circuit board according to the engine cycle and a central processing unit, comprising:

generating, through the component, a plurality of actuator control pulses, the pulses being parameterizable in phase and in duration, being independent, be linked with a single cylinder and being synchronized by an angular reference point in the engine cycle for each cylinder;

determining the pulse parameters and assigning the parameters to the pulses by a computation program included in the central processing unit at each physical output; and controlling at least one of the actuators by a logic output signal of the circuit board corresponding to at least one of the control pulses; and wherein synchronization is obtained from at least one of the following sensors: for a 2-stroke engine: an angular coder and a 58× vehicle target; and for a 4-stroke engine: a camshaft sensor and at least an angular coder and a 58× vehicle target.

6. A method as claimed in claim 5, wherein generation of the pulses is performed at a frequency corresponding to the angular coding frequency and the central processing unit determines the parameters at a lower frequency.

7. A method for operating an internal-combustion engine, comprising at least one actuator connected to a working device of the engine, a programmable logic component, means for synchronizing the component according to the engine cycle and a central processing unit, comprising:

generating, through the component, a plurality of actuator control pulses, the pulses being parameterizable in phase and in duration, being independent, being linked with a single cylinder and being synchronized by an angular reference point in the engine cycle for each cylinder;

determining the pulse parameters and assigning the parameters to the pulses by a computation program included in the central processing unit at each physical output; and controlling at least one of the actuators by a logic output signal of the component corresponding to at least one of the control pulses; and wherein synchronization is obtained from at least one of the following sensors: for a 2-stroke engine: an angular coder and a 58× vehicle target, and for a 4-stroke engine: a camshaft sensor and at least one of: an angular coder and a 58× vehicle target.

8. A method as claimed in claim 7, wherein generation of the pulses is performed at a frequency corresponding to the angular coding frequency and the central processing unit determines the parameters at a lower frequency.

9. A system for operating an internal-combustion engine, comprising at least one actuator connected to a working device of the engine, an electronic circuit board comprising a programmable logic FPGA component, means for synchronizing the component according to an engine cycle and an industrially available microcomputer comprising:

the component comprises means programmed to generate an angular reference point in the engine cycle for each cylinder and generate a plurality of actuator control pulses parameterizable in phase and in duration, the pulses being independent and linked with a cylinder;

a central processing unit of the microcomputer comprises means for determining the pulse parameters; and means for controlling at least one of the actuators by a circuit board output signal corresponding to at least one of the control pulses; and wherein the means for synchronizing comprises for a 2-stroke engine, at least one of the following sensors: an angular coder, and a 58× vehicle target; and for a 4-stroke engine, a camshaft sensor and at least one of the following sensors: an angular coder; and a 58× vehicle target.

10. A system as claimed in claim 9, wherein the actuator comprises at least one of: an injection nozzle, a spark plug, an electromagnetic valve control or a LASER camera shot.

11. A system as claimed in claim 9, wherein the actuator comprises at least one of: an injection nozzle, a spark plug, an electromagnetic valve control or a LASER camera shot.

12. A system for operating an internal-combustion engine, comprising at least one actuator connected to a working device of the engine, a programmable logic component, means for synchronizing the component according to an engine cycle and an industrially available microcomputer comprising:

the component comprises means programmed to generate an angular reference point in the engine cycle for each cylinder and generate a plurality of actuator control pulses parameterizable in phase and in duration, the pulses being independent and linked with a cylinder;

the microcomputer comprises means for determining the pulse parameters; and means for controlling at least one of the actuators by a component output signal corresponding to at least one of the control pulses; and wherein the means for synchronization comprises for a 2-stroke engine, at least one of the following sensors: an angular coder and a 58× vehicle target, and for a 4-stroke engine, a camshaft sensor and at least one of the following sensors: an angular coder and a 58× vehicle target.

13. A system as claimed in claim 12, wherein the actuator comprises at least one of: an injection nozzle, a spark plug, an electromagnetic valve control and a LASER camera shot.

14. A system as claimed in claim 12, wherein the actuator comprises at least one of: an injection nozzle, a spark plug, an electromagnetic valve control and a LASER camera shot.

* * * * *